United States Patent
Ren et al.

(10) Patent No.: US 10,476,785 B2
(45) Date of Patent: Nov. 12, 2019

(54) IP ROUTING SEARCH (71) Applicant: NEW H3C TECHNOLOGIES CO., LTD., Hangzhou (CN)

(72) Inventors: Kai Ren, Beijing (CN); Changzhong Ge, Beijing (CN); Shaoliang An, Beijing (CN)

(73) Assignee: NEW H3C TECHNOLOGIES CO., LTD, Hangzhou, (CN)

(*) Notice: Subject to any disclaimer, the term of this patent is extended or adjusted under 35 U.S.C. 154(b) by 0 days.

(21) Appl. No.: 15/574,447

(22) PCT Filed: Jun. 30, 2016

(86) PCT No.: PCT/CN2016/087829
§ 371 (c)(1),
(2) Date: Nov. 15, 2017

(87) PCT Pub. No.: WO2017/000892
PCT Pub. Date: Jan. 5, 2017

(65) Prior Publication Data
US 2018/0145903 A1 May 24, 2018

(30) Foreign Application Priority Data
Jun. 30, 2015 (CN) .......................... 2015 1 0385002

(51) Int. Cl.
*H04L 12/749* (2013.01)
*H04L 12/745* (2013.01)
(Continued)

(52) U.S. Cl.
CPC ............ *H04L 45/48* (2013.01); *H04L 45/741* (2013.01); *H04L 45/748* (2013.01); *H04L 63/0272* (2013.01)

(58) Field of Classification Search
CPC combination set(s) only.
See application file for complete search history.

(56) References Cited

U.S. PATENT DOCUMENTS 7,610,271 B2 * 10/2009 Cao .................. G06F 16/90344
2011/0255544 A1 10/2011 Chidambaram
(Continued)

FOREIGN PATENT DOCUMENTS

| CN | 1787477 A | 6/2006 |
|---|---|---|
| CN | 101141389 A | 3/2008 |
| CN | 105141525 A | 12/2015 |

OTHER PUBLICATIONS

International Search Report for International Application No. PCT/CN2016/087829, dated Sep. 21, 2016 (3 pages).
(Continued)

*Primary Examiner* — Kodzovi Acolatse
*Assistant Examiner* — The Hy Nguyen
(74) *Attorney, Agent, or Firm* — McCarter & English, LLP; Kia L. Freeman; Thomas F. Foley (57) ABSTRACT

A Multibit Trie is created for routing distribution of IP prefixes in each Virtual Private Network (VPN). Routing of IP prefixes in the highest level 1~m of the Multibit Trie is expanded to IP prefixes in level m+1 according to a prefix expansion method, wherein m is an integer larger than 1. Each branch of the IP prefixes in the level m+1 of the Multibit Trie is taken as a Branch_Tree, and data structure information of each Branch_Tree is saved. When routing of an IP address in a VPN is to be searched, a Branch_Tree is searched in a Multibit Trie corresponding to the VPN according to the highest m+1 bits of the IP address, and the routing of the IP address is searched in the Branch_Tree.

16 Claims, 8 Drawing Sheets

(51) Int. Cl.
*H04L 12/753* (2013.01)
*H04L 29/06* (2006.01)

(56) References Cited

U.S. PATENT DOCUMENTS

2012/0185582 A1* 7/2012 Graessley ............... H04L 45/70
709/224
2015/0207737 A1* 7/2015 Purohit ............... H04L 45/7453
370/392

OTHER PUBLICATIONS

Eatherton, et al., Tree Bitmap: Hardware/Software IP Lookups with Incremental Updates, ACM SIGCOMM Computer Commc'ns. Rev., vol. 34, No. 2 at 97 (Apr. 2004) (26 pgs).

Advanced Network Technology Center, University of Oregon, University of Oregon Route Views Project. Retrieved online at http://www.routeviews.org/. 5 pages. (Jan. 27, 2005).

Bando et al., FlashTrie: Flash-based Prefix-Compressed Tile for IP Route Lookup Beyond 100Gbps. IEEE INFOCOM 2010 proceedings. 9 pages.

Eatherton et al., Tree Bitmap: Hardware/Software IP Lookups with Incremental Updates. Retrieved online at: http:/citeseerx.ist.psu.edu/viewdoc/summary?doi=10.1.1.12.6583. 21 pages (2002).

IPv6 CIDR Report for Jan. 26, 2015. Archived online at Internet Archive. Retrieved from: https://web.archive.org/web/20150126210901/http://www.cidr-report.org/as2.0/ on Feb. 14, 2018. 47 pages (Jan. 26, 2015).

Mitzenmacher et al., Some Open Questions Related to Cuckoo Hashing. European Symposium on Algorithms. 10 pages (2009).

Mitzenmacher, Cuckoo Hashing and CAMs. Slideshow. [Cisco/Google 2008]. Retrieved online at: https://www.eecs.harvard.edu/~michaelm/Talks.html. 48 pages (2008).

Srinivasan et al., Fast Address Lookups Using Controlled Prefix Expansion. ACM Transactions on Computer Systems. Feb. 1999;17(1):1-40.

Sahni, et al., Efficient Construction of Multibit Tries for IP Lookup, IEEE/ACM Transactions on Networking, vol. 11, No. 4 (Aug. 2003) (13 pgs).

Fast Routing Lookup Algorithms Based on Multi-bit Trie, Xidian University (2009) (59 pgs).

* cited by examiner

IP ROUTING SEARCH

RELATED APPLICATIONS

This application is a 35 U.S.C. § 371 national stage filing of International Application No. PCT/CN2016/087829, filed on Jun. 30, 2016, which claims priority to Chinese Patent Application No. 201510385002.1, filed on Jun. 30, 2015. The entire contents of each of the foregoing applications are incorporated herein by reference.

BACKGROUND

Network communications are performed to transfer data. Accordingly, one of functions of a network device is to perform high-efficiency data transfer. A function of the network device on a basic data plane of Internet protocol is routing search. The network device determines a next hop and an egress port for each received data packet according to prefix information in a routing table. Wildcard characters and Longest Prefix Matching (LPM) of Classless Inter-Domain Routing (CIDR) in the routing table make the routing search complex.

BRIEF DESCRIPTION OF THE DRAWINGS

FIG. 7-1 is a diagram illustrating a process of expanding routing of a prefix in level /0 to a prefix in level /1 with reference to the Unibit Trie shown in FIG. 1 according to some examples of the present disclosure.

FIG. 7-2 is a diagram illustrating a process of expanding routing of a prefix in level /1 to a prefix in level /2 with reference to the Unibit Trie shown in FIG. 1 according to some examples of the present disclosure.

FIG. 7-3 is a diagram illustrating a process of expanding routing of a prefix in level /2 to a prefix in level /3 with reference to the Unibit Trie shown in FIG. 1 according to some examples of the present disclosure.

DETAILED DESCRIPTION

A Tree Bitmap is a routing search algorithm based on a Multibit Trie, and may be applied to Carrier Routing System (CRS) series high-end routers. A Unibit Trie and the Multibit Trie will be illustrated to learn the Tree Bitmap.

Figure 1:
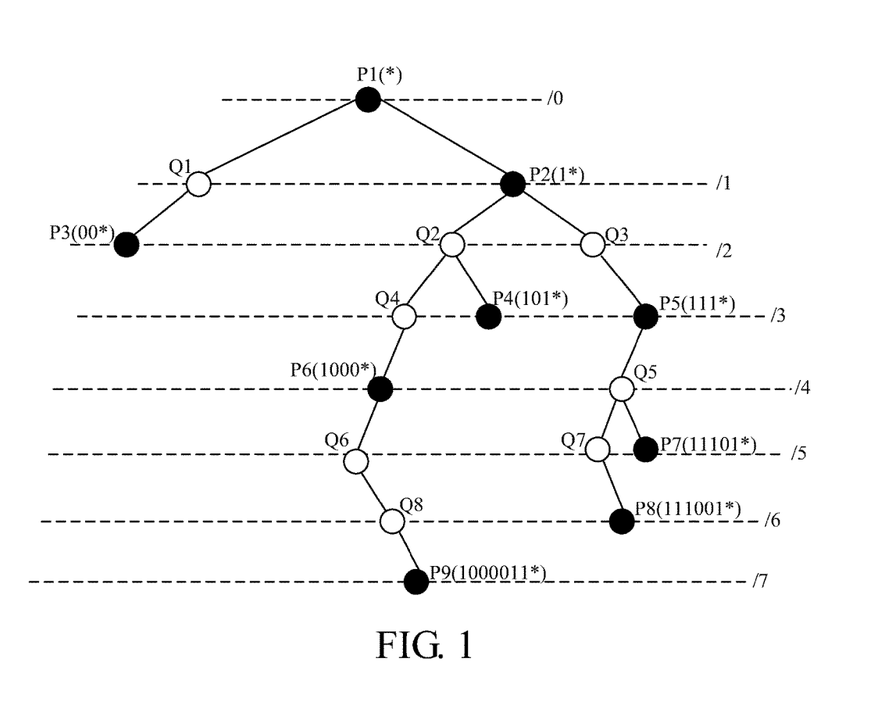
FIG. 1 is a diagram illustrating a Unibit Trie.

FIG. 1 is a diagram illustrating a Unibit Trie. The Unibit Trie shown in FIG. 1 includes nine IPv4 prefixes, represented as P1~P9. A prefix P1 of the highest node of the Unibit Trie is *. A prefix Q1 of the next-level left branch of the prefix P1 is 0*, and a prefix P2 of the next-level right branch of the prefix P1 is 1*. A prefix P3 of the next-level left branch of the prefix Q1 is 00*, a prefix Q2 of the next-level left branch of the prefix P2 is 10*, a prefix Q3 of the next-level right branch of the prefix P2 is 11*, and so on. The "*" indicates a location where a prefix is located. For example, for any prefix N in the Unibit Trie, a prefix of the next-level left branch of the prefix N is N0 and a prefix of the next-level right branch of the prefix N is N1.

In the Unibit Trie shown in FIG. 1, a "•" node indicates a node where a routing prefix is valid, and a "○" node indicates a node where a routing prefix is invalid. As shown in FIG. 1, the prefixes P1~P9 correspond to nodes where routing prefixes are valid, and the prefixes Q1~Q8 correspond to nodes where routing prefixes are invalid. In some examples of the present disclosure, a node where a routing prefix is valid indicates that the node is configured with routing.

A routing search process based on LPM in the Unibit Trie is described as follows.

If LPM routing of an IPv4 prefix is to be searched, according to a descending order of bits in the IPv4 prefix, one bit of the IPv4 prefix is searched in the Unibit Trie every time. If the bit is "0", a next-level left branch of the Unibit Trie is found, if the bit is "1", a next-level right branch of the Unibit Trie is found, and so on. The search operation is performed until the bottom of the Unibit Trie, and routing of the last "•" node is the LPM routing of the IPv4 prefix.

For example, if LPM routing of an IPv4 prefix 10000110 is to be searched in the Unibit Trie shown in FIG. 1, a LPM routing search process includes:

determining the highest bit of the IPv4 prefix 10000110, i.e., "1", and entering the next-level right branch P2 from P1 of the Unibit Trie, which is represented as P1->P2;

determining the second bit of the IPv4 prefix 10000110, i.e., "0", and entering the next-level left branch Q2 from P2 of the Unibit Trie, which is represented as P2->Q2;

determining the third bit of the IPv4 prefix 10000110, i.e., "0", and entering the next-level left branch Q4 from Q2 of the Unibit Trie, which is represented as Q2->Q4;

determining the fourth bit of the IPv4 prefix 10000110, i.e., "0", and entering the next-level left branch P6 from Q4 of the Unibit Trie, which is represented as Q4->P6;

determining the fifth bit of the IPv4 prefix 10000110, i.e., "0", and entering the next-level left branch Q6 from P6 of the Unibit Trie, which is represented as P6->Q6;

determining the sixth bit of the IPv4 prefix 10000110, i.e., "1", and entering the next-level right branch Q8 from Q6 of the Unibit Trie, which is represented as Q6->Q8;

determining the seventh bit of the IPv4 prefix 10000110, i.e., "1", and entering the next-level right branch P9 from Q8 of the Unibit Trie, which is represented as Q8->P9. At this time, the bottom of the Unitbit Trie has been searched, and thus the LPM routing search process terminates. Since P9 corresponds to the last "•" node, routing of P9 is the LPM routing of the IPv4 prefix 10000110.

When the LPM routing of the IPv4 prefix 10000110 is searched in the Unibit Trie, seven search operations are performed via P1->P2->Q2->Q4->P6->Q6->Q8->P9.

Figure 2:
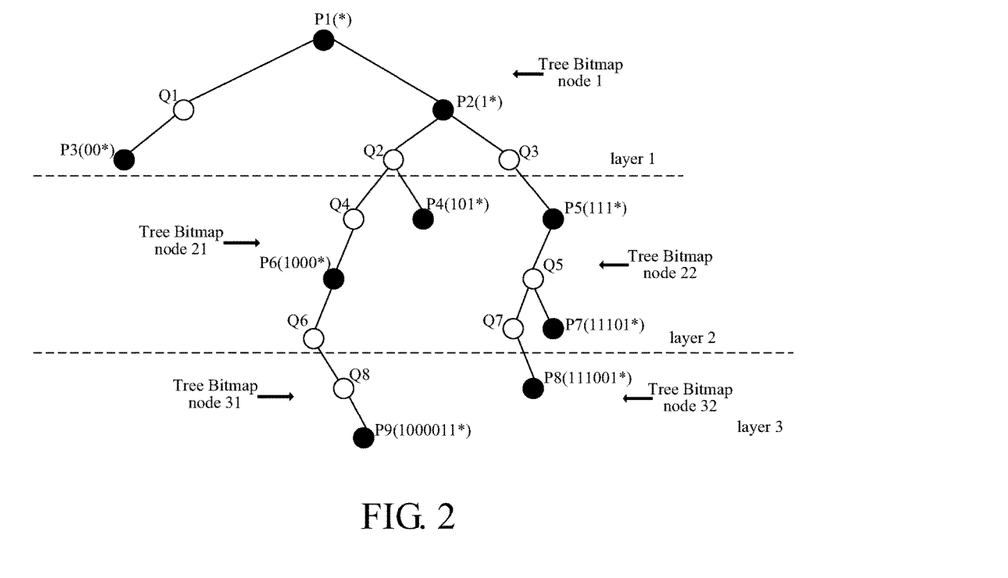
FIG. 2 is a diagram illustrating a conversion process from a Unibit Trie to a Multibit Trie.

A Multibit Trie may be created based on the Unibit Trie. In the Multibit Trie, every time LPM routing of a prefix is searched, multiple bits of the prefix may be searched. FIG. 2 is a diagram illustrating a conversion process from a Unibit Trie to a Multibit Trie. As shown in FIG. 2, every time LPM routing of a prefix is searched, three bits of the prefix are searched in the Multibit Trie. In this case, the search step size of the LPM routing is 3.

In a tree Bitmap, the data structure of nodes in the Multibit Trie may be optimized, so as to be more suitable to hardware pipeline implementation of large access granularity architecture based on Static Random Access Memory (SRAM) and Dynamic Random Access Memory (DRAM). The Multibit Trie may be divided into multiple layers according to predefined search step size of LPM routing. For example, if the search step size of LPM routing is predefined as 3, the Multibit Trie shown in FIG. 2 may be divided into three layers, represented as layer 1, layer 2 and layer 3. In some examples of the present disclosure, a Multibit Trie includes prefixes of i levels, and the i levels are divided into j layers according to routing search size, wherein j<i, each of the i levels is represented as "level", and each of the j layers is represented as "layer".

Figure 3:
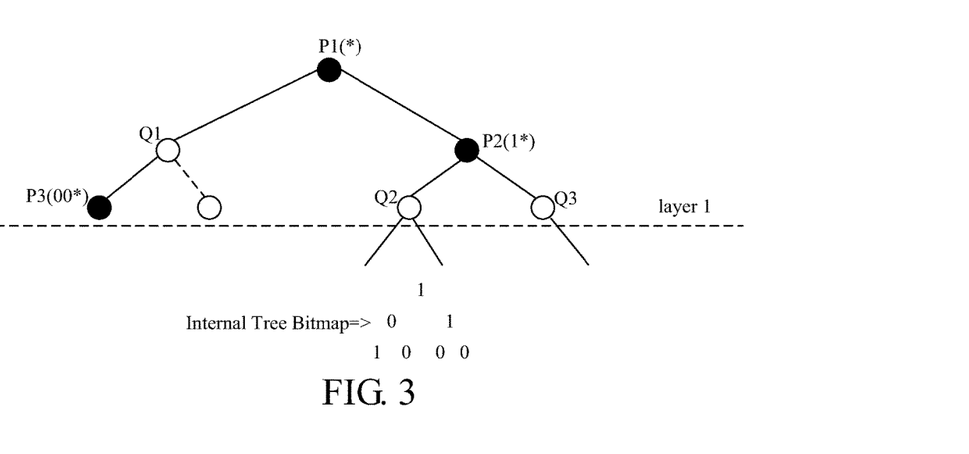
FIG. 3 is a diagram illustrating the structure of layer 1 shown in FIG. 2.

FIG. 3 is a diagram illustrating the structure of layer 1 shown in FIG. 2.

In the Multibit Trie, each layer includes one or more Tree Bitmap node(s). Each Tree Bitmap node in a layer has a highest-level prefix of the layer, and the highest-level prefix and its descendant prefixes form a sub_Trie.

In some examples, the search step size of the LPM routing is S and the Multibit Trie may be divided into N levels, represented as layers 1~N. Accordingly, layer 1 includes one Tree Bitmap node. Layer 2 includes $2^S$ highest-level prefixes at most, and each of the $2^S$ highest-level prefixes and its descendant prefixes form a sub_Trie. Accordingly, layer 2 includes $2^S$ Tree Bitmap nodes at most, and layer m ($1 \leq m \leq N$) includes $2^{(m-1)S}$ Tree Bitmap nodes at most.

For example, as shown in FIG. 2, layer 1 includes one Tree Bitmap node, layer 2 includes three Tree Bitmap nodes, and layer 3 includes two Tree Bitmap nodes.

Each Tree Bitmap node may be described with four parameters including an Internal Tree Bitmap, an Extending Paths Bitmap, a Result Array Pointer and a Child Node Pointer.

The Internal Tree Bitmap indicates routing distribution of prefixes inside a Tree Bitmap node. For example, when the search step size of LPM routing is S, there are ($2^S-1$) prefixes inside the Tree Bitmap node at most. Accordingly, the Internal Tree Bitmap includes ($2^S-1$) bits, and each bit of the Internal Tree Bitmap indicates whether a prefix inside the Tree Bitmap node is valid. If the prefix is valid, the value of the bit is "1"; if the prefix is invalid, the value of the bit is "0".

For example, as shown in FIG. 3, since the search step size of the LPM routing is S=3, the Internal Tree Bitmap of the Tree Bitmap node of layer 1 includes $2^3-1=7$ bits, represented as 1_01_1000, wherein "1" indicates that a corresponding prefix is valid, and "0" indicates that a corresponding prefix is invalid.

The Extending Paths Bitmap indicates distribution of next-level Tree Bitmap nodes of a Tree Bitmap node. For example, when the search step size of the LPM routing is S, the Tree Bitmap node has $2^S$ branches at most, and thus has $2^S$ next-level Tree Bitmap nodes at most. Accordingly, the Extending Paths Bitmap includes $2^S$ bits, and each bit indicates whether a branch of the Tree Bitmap node has a next-level Tree Bitmap node. When the branch of the Tree Bitmap node has a next-level Tree Bitmap node, the value of the bit is "1"; when the branch of the Tree Bitmap node has no next-level Tree Bitmap node, the value of the bit is "0".

For example, since the search step size of the LPM routing is S=3, the Tree Bitmap node of layer 1 shown in FIG. 3 has $2^3=8$ branches at most, and thus the Extending Tree Bitmap of the Tree Bitmap includes $2^3=8$ bits, represented as 00001101, wherein "1" indicates that a corresponding branch of the Tree Bitmap node has a next-level Tree Bitmap node, and "0" indicates that a corresponding branch of the Tree Bitmap node has no next-level Tree Bitmap node. As shown in FIG. 2, the Tree Bitmap node of layer 1 has three next-level Tree Bitmap nodes.

The Result Array Pointer refers to a head pointer of a Result Array (RA) corresponding to a valid prefix inside a Tree Bitmap node. The RA stores routing information of each valid prefix in the Tree Bitmap node, and the routing information includes Next Hop information, Forwarding Equivalence Class (FEC) information and so on.

The number of valid prefixes inside the Tree Bitmap node may be determined according to the Internal Tree Bitmap, and RA stores the routing information of the prefixes in order. For example, a RA pointed by the Result Array Pointer of the Tree Bitmap node of layer 1 shown in FIG. 3 stores routing information of P1, P2 and P3 in order and the Result Array Pointer points to the routing information of P1.

The Child Node Pointer refers to a head pointer of information of a next-level Tree Bitmap node of the Tree Bitmap node.

The distribution of the next-level Tree Bitmap node of the Tree Bitmap node may be determined according to the Extending Paths Bitmap. For example, branches having a next-level Tree Bitmap node may be determined. Information of all "valid" next-level Tree Bitmap nodes of the Tree Bitmap node is stored in a memory in order. The "valid" refers to that a corresponding bit in the Extending Paths Bitmap is "1".

For example, the Tree Bitmap node of layer 1 shown in FIG. 3 has three next-level Tree Bitmap nodes, and a memory pointed by the Child Array Pointer stores information of the three next-level Tree Bitmap nodes in order. The information of each next-level Tree Bitmap node is described with the Internal Tree Bitmap, the Extending Paths Bitmap, the Result Array Pointer and the Child Node Pointer.

For example, if the search step size of LPM routing is 3, the IPv4 prefix 10000110 is divided into multiple segments, represented as "100_001_10". If LPM routing of the IPv4 prefix is to be searched in the Multibit Trie shown in FIG. 2, a LPM routing search process is described as follows.

When the search step size of the LPM routing in FIG. 2 is 3, the highest 3 bits of the IPv4 prefix, i.e., "100", are obtained, and a prefix matching with "100" is searched in the Internal Tree Bitmap of the Tree Bitmap node in layer 1, wherein the Tree Bitmap node of layer 1 is called Tree Bitmap node 1, i.e. P1. As described above, the Internal Tree Bitmap of the Tree Bitmap node 1 in layer 1 is 1_01_1000, and thus it is determined that P1 and P2 match with "100". Because P2 has a longer prefix, a LPM matching result in layer 1 is P2.

A bit corresponding to the highest 3 bits "100" is searched in the Extending Paths Bitmap of the Tree Bitmap node in layer 1. The highest 3 bits "100" corresponds to the fifth branch of the Tree Bitmap node, and thus the fifth bit of the Extending Paths Bitmap is found. As described above, the Extending Tree Bitmap of the Tree Bitmap node in layer 1 is represented as 00001101, and thus the found bit is "1". Accordingly, it is determined that the branch corresponding to the highest 3 bits "100" has a next-level Tree Bitmap node and the next-level Tree Bitmap node is the first Tree Bitmap node pointed by the Child Node Pointer, i.e., the first Tree Bitmap node 21 in layer 2. As shown in FIG. 2, the first Tree Bitmap node 21 in layer 2 is Q4. Information of the Tree Bitmap node 21 is read from a memory by using the Child Node Pointer. The information of the Tree Bitmap node 21 includes the Internal Tree Bitmap, the Extending Paths Bitmap and the Child Node Pointer.

Then, the middle 3 bits of the IPv4 prefix, i.e., "001", are obtained and a prefix matching with "001" is searched in the Internal Tree Bitmap of the Tree Bitmap node 21. The Internal Tree Bitmap of the Tree Bitmap node 21 is 0_10_0000, and thus it is determined that P6 matches with "001". Accordingly, LPM matching result in layer 2 is P6.

A bit corresponding to the middle 3 bits "001" is searched in the Extending Paths Bitmap of the Tree Bitmap node 21 in layer 2. The middle 3 bits "001" corresponds to the second branch of the Tree Bitmap node 21, and thus the second bit of the Extending Paths Bitmap of the Tree Bitmap node 21 is found. The Extending Paths Bitmap of the Tree Bitmap node 21 is represented as 01000000, and the found bit is "1". Accordingly, it is determined that the Tree Bitmap node 21 has a next-level Tree Bitmap node and the next-level Tree Bitmap node is the first Tree Bitmap node pointed by the Child Node Pointer of the Tree Bitmap node 21, i.e., the first Tree Bitmap node 31 in layer 3. As shown in FIG. 2, the first Tree Bitmap node 31 in layer 3 is Q8. Information of the Tree Bitmap node 31 is read from the memory by using the Child Node Pointer of the Tree Bitmap node 21. The information of the Tree Bitmap node 31 includes the Internal Tree Bitmap, the Extending Paths Bitmap and the Child Node Pointer.

Since the Tree Bitmap node 31 is located at the bottom of the Multibit Trie and only has the Internal Tree Bitmap, the lowest 2 bits of the IPv4 prefix, i.e., "10", are obtained, and a prefix matching with "10" is searched in the Internal Tree Bitmap of the Tree Bitmap node 31. The Internal Tree Bitmap of the Tree Bitmap node 31 is 0_01, and thus it is determined that P9 matches with "10". Accordingly, a LPM matching result in layer 3 is P9.

By using the Multibit Trie, the number of search operations performed for the LPM routing may be greatly reduced. For example, when the LPM routing of the IPv4 prefix "10000110" is searched in the Multibit Trie, three search operations are performed via Tree Bitmap node 1->Tree Bitmap node 21->Tree Bitmap node 31.

In the search process of Tree Bitmap node 1->Tree Bitmap node 21->Tree Bitmap node 31, a LPM search result of nodes in each layer is transferred to nodes in a next layer, and the nodes in the next layer may obtain a LPM result thereof according to the transferred LPM result and transfer the obtained LPM result to nodes in a next layer. For example, the LPM result obtained by the Tree Bitmap node 1 is P2, and the Tree Bitmap node 1 transfers P2 to the Tree Bitmap node 21. The LPM result obtained by the Tree Bitmap node 21 is P6. P6 is longer than P2 transferred by the Tree Bitmap node 1, and thus P6 is transferred to the Tree Bitmap node 31. The LPM result obtained by the Tree Bitmap node 31 is P9. P9 is longer than P6, and thus is determined as a finial LPM result.

The RA pointer corresponding to P9 may be obtained according to the Internal Tree Bitmap and the Result Array Pointer of the Tree Bitmap node 31, and the RA is read from the memory and determined as the final LPM routing.

In the above search process, four search operations are performed in memory, which include operations of searching for information of the Tree Bitmap node 1, searching information of the Tree Bitmap node 21, searching information of the Tree Bitmap node 31 and searching the RA.

Figure 4:
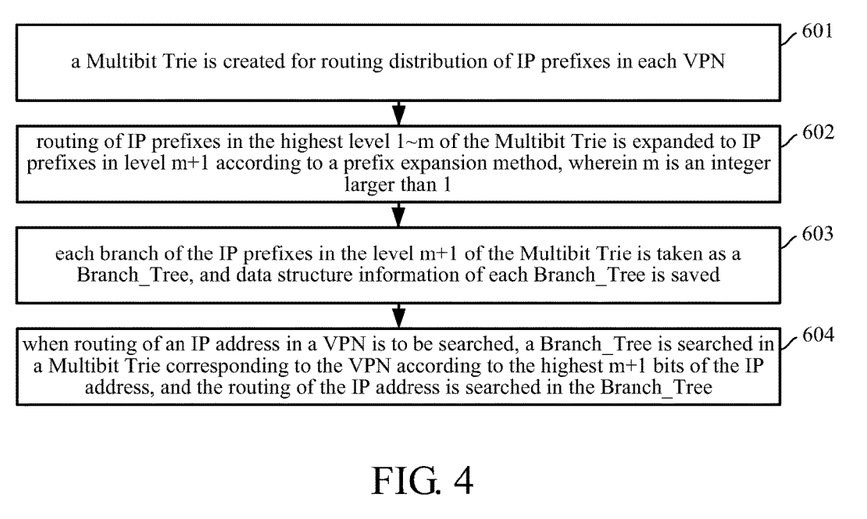
FIG. 4 is a flowchart illustrating an Internet Protocol (IP) routing search method based on a Multibit Trie according to some examples of the present disclosure.

FIG. 4 is a flowchart illustrating an IP routing search method based on a Multibit Trie according to some examples of the present disclosure. As shown in FIG. 4, the method includes following blocks.

At block 601, a Multibit Trie is created for routing distribution of IP prefixes in each VPN.

At block 602, routing of IP prefixes in the highest level 1~m of the Multibit Trie is expanded to IP prefixes in level m+1 according to a prefix expansion method, wherein m is an integer larger than 1.

At block 603, each branch of the IP prefixes in the level m+1 of the Multibit Trie is taken as a Branch_Tree, and data structure information of each Branch_Tree is saved.

At block 604, when routing of an IP address in a VPN is to be searched, a Branch_Tree is searched in a Multibit Trie corresponding to the VPN according to the highest m+1 bits of the IP address, and the routing of the IP address is searched in the Branch_Tree.

In some examples, default routing of a prefix in level 0 is saved in a predefined area of an off-chip storage.

In some examples, the process of saving the data structure information of each Branch_Tree includes: saving the data structure information of each Branch_Tree in an idle area of the off-chip storage.

In some examples, the process of saving the data structure information of each Branch_Tree further includes:

maintaining a VPN Root Bitmap (VRB) table for the Branch_Tree. The VRB Table contains a Compressed Extending Path Bitmap (CEPB) and a Child Node Pointer (CNP). The CEPB includes $2^{m+1}/2^d$ bits, and every $2^d$ continuous Branch_Trees correspond to one bit of the CEPB. When the $2^d$ continuous Branch_Trees include a valid Branch_Tree, the bit of the CEPB corresponding to the $2^d$ continuous Branch_Trees is valid; and when the $2^d$ continuous Branch_Trees do not include a valid Branch_Tree, the bit of the CEPB corresponding to the $2^d$ continuous Branch_Trees is invalid, wherein d is a positive integer. The CNP indicates a pointer of the first Branch_Tree in the $2^d$ continuous Branch_Trees corresponding to the first valid bit of the CEPB.

In some examples, the process of searching for the Branch_Tree in the Multibit Trie corresponding to the VPN according to the highest m+1 bits of the IP address, and searching for the routing of the IP address in the Branch_Tree includes:

obtaining the highest m+1 bits of the IP address, and finding a bit in the CEPB of the VRB Table of the Multibit-Trie according to the highest m+1−d bits of the IP address; if the found bit is valid, determining a CNP corresponding to the lowest d bits of the highest m+1 bits of the IP address, and finding data structure information of the Branch_Tree according to the CNP; and searching for the routing of the IP address according to the data structure information of the Branch_Tree.

In some examples, before expanding the routing of the IP prefixes in the highest level 1~m of the Multibit Trie to the IP prefixes in the level m+1 according to the prefix expansion method, the method further includes:

according to a rule of making a segment including more valid IP prefixes be located in the bottom of a layer, classifying IP prefixes in levels 0~8 of the Multibit Trie into layer 0, classifying IP prefixes in the lowest 7 levels into the last layer, and dividing other IP prefixes into multiple layers according to step size 8.

In some examples, the process of expanding the routing of the IP prefixes in the highest level 1~m of the Multibit Trie to the IP prefixes in the level m+1 according to the prefix expansion method includes:

expanding routing of IP prefixes in levels 1~8 of the Multibit Trie to IP prefixes in level 9 according to the prefix expansion method.

In some examples, the process of saving the data structure information of each Branch_Tree includes:

for each Sub_Trie in each layer in each Branch_Tree except layer 0, expanding routing of IP prefixes in levels 0, 1 and 2 in the Sub_Trie to IP prefixes in level 3; dividing each Sub_Trie into eight segmented Sub_Tries evenly, and saving data structure information of each segmented Sub_Trie, wherein each segmented Sub_Trie is indexed by IP prefixes of the highest 3 levels of the Sub_Trie.

In some examples, the process of searching for the routing in the Branch_Tree includes:

when searching for the routing in a layer, indexing a segmented Sub_Trie in a Sub_Trie in the layer according to the highest 3 bits of 7 bits corresponding to the IP address in the layer, and searching for the routing according to data structure information of the segmented Sub_Trie.

In some examples, the data structure information of each Sub_Trie in the last layer includes:

q Prefix Keys, wherein each Prefix key indicates the lowest 7 bits of an IP addresses of a valid IP prefix in the Sub_Trie, q is the predefined maximum number of valid IP prefixes in the Sub_Trie; and a Result Array pointer (ptr).

In some examples, when searching for the routing in the Branch_Tree and searching in the last layer, the lowest 7 bits of the IP address are matched with Prefix Keys in the data structure information of each Sub_Trie in the last layer; if the lowest 7 bits of the IP address matches with the Prefix Keys in the data structure information of each Sub_Trie in the last layer, the routing is determined according to the Result Array ptr.

In some examples, the process of searching for the routing in the Branch_Tree further includes:

if the routing is not found, obtaining the default routing from the predefined area of the off-chip storage, and taking the default routing as the final routing.

Figure 5:
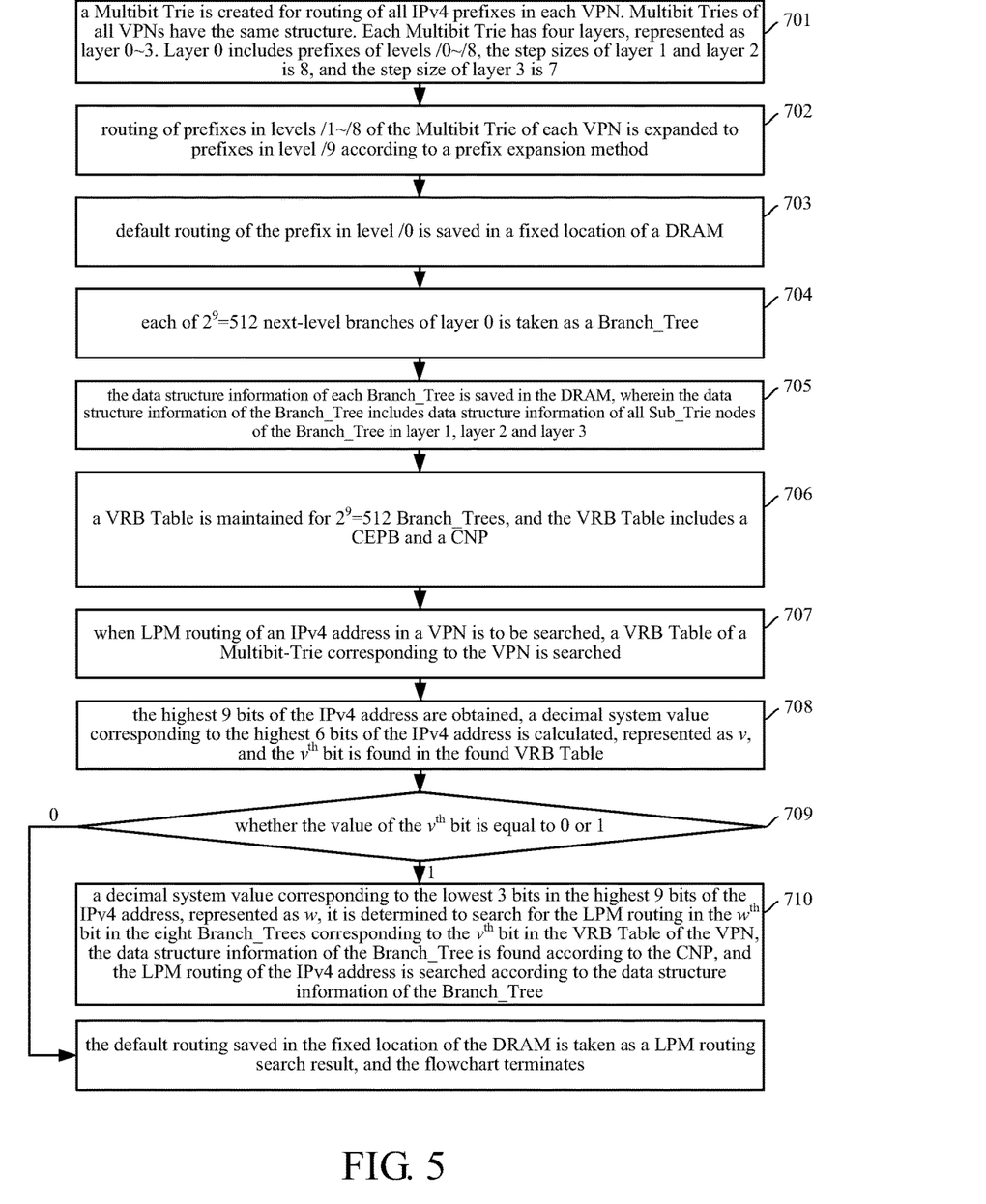
FIG. 5 is a flowchart illustrating an IPv4 routing search method based on a Multibit Trie according to some examples of the present disclosure.

FIG. 5 is a flowchart illustrating an IPV4 routing search method based on a Multibit Trie according to some examples of the present disclosure. As shown in FIG. 5, the method includes following blocks.

At block 701, a Multibit Trie is created for routing of all IPv4 prefixes in each VPN. Multibit Tries of all VPNs have the same structure. Each Multibit Trie has four layers, represented as layer 0~3. Layer 0 includes prefixes of levels /0~/8, the step sizes of layer 1 and layer 2 is 8, and the step size of layer 3 is 7.

Accordingly, the number of VPNs is the same as the number of Multibit Tries.

Figure 6:
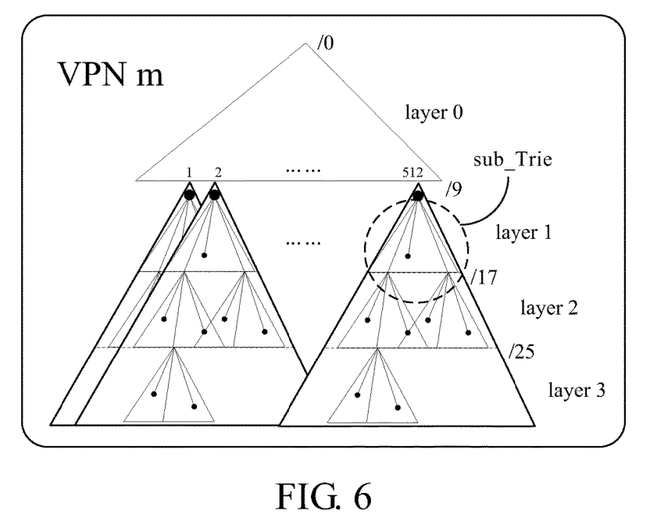
FIG. 6 is a diagram illustrating the structure of a Multibit Trie created for routing of IPv4 prefixes in a Virtual Private Network (VPN) according to some examples of the present disclosure.

FIG. 6 is a diagram illustrating the structure of a Multibit Trie created for routing of IPv4 prefixes in a VPN (represented as VPN m) according to some examples of the present disclosure. As shown in FIG. 6, the Multibit Trie includes prefixes of 32 levels, i.e., prefixes in levels /0~/31. Prefixes of layer 0 include prefixes in levels /0~/8 corresponding to the highest 9 bits of an IPv4 address, i.e., 1-9 bits, prefixes in layer 1 include prefixes in levels /9~/16 corresponding to 10~17 bits of the IPv4 address, prefixes in layer 2 include prefixes in levels /17~/24 corresponding to 18~25 bits of the IPv4 address, and prefixes in layer 3 include prefixes in levels /25~/31 corresponding to 26~32 bits of the IPv4 address.

In some examples, the prefixes in levels /9~/31 of the Multibit Trie are divided according to step sizes 8, 8 and 7, so as to make a segment including more valid prefixes be located in the bottom of layer 1 and layer 2, and further to make the number of sub_Trie nodes in the Multibit Trie decrease.

At block 702, routing of prefixes in levels /1~/8 of the Multibit Trie of each VPN is expanded to prefixes in level /9 according to a prefix expansion method.

Prefix expansion refers to expanding routing of a prefix with a short mask to multiple prefixes with a long mask, thereby decreasing the number of search operations performed for LPM routing.

For example, the routing of prefixes in levels /0, /1 and /2 of the Multibit Trie shown in FIG. 2 may be expanded to the prefixes in level /3, which can be implemented as follows.

Routing of a prefix in level /0 may be expanded to prefixes in level /1.

Figure 71:
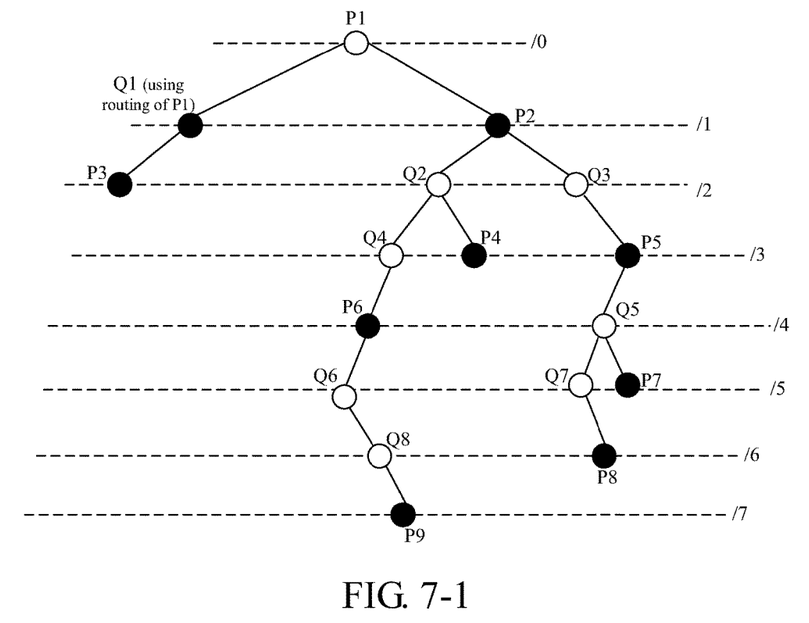

The routing of the prefix P1 in level /0 may be expanded to the prefixes Q1 and P2 in level /1. Since the prefix P2 is valid and the priority of the routing of the prefix P2 is higher than the priority of the routing of the prefix P1, the routing of the prefix P1 may be expanded to the prefix Q1, as shown in FIG. 7-1.

Routing of prefixes in level /1 may be expanded to prefixes in level /2.

There are two prefixes Q1 and P2 in level /1.

Figure 72:
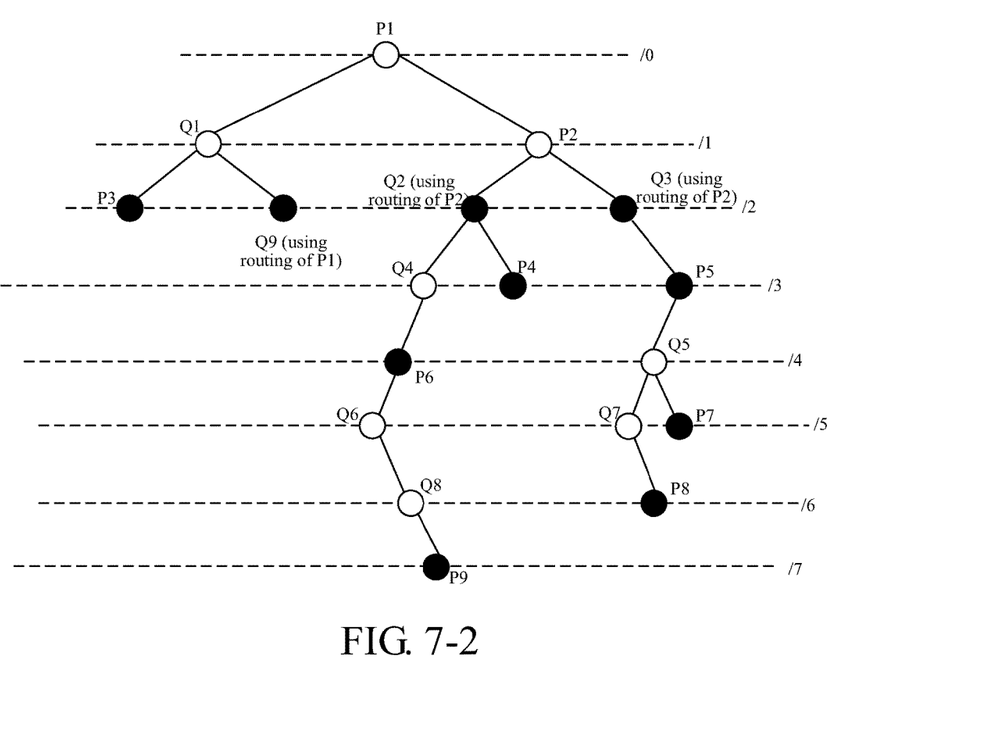

The routing of the prefix Q1 may be expanded to the prefixes P3 and Q9 in level /2. Since the prefix P3 is valid and the priority of the routing of the prefix P3 is higher than the priority of the routing of the prefix Q1, the routing of the prefix Q1 may be expanded to the prefix Q9, as shown in FIG. 7-2.

The routing the prefix P2 may be expanded to the prefixes Q2 and Q3 in level /2, as shown in FIG. 7-2.

Routing of prefixes in level /2 may be expanded to prefixes in level /3.

There are four prefixes P3, Q9, Q2 and Q3 in level /2.

Figure 73:
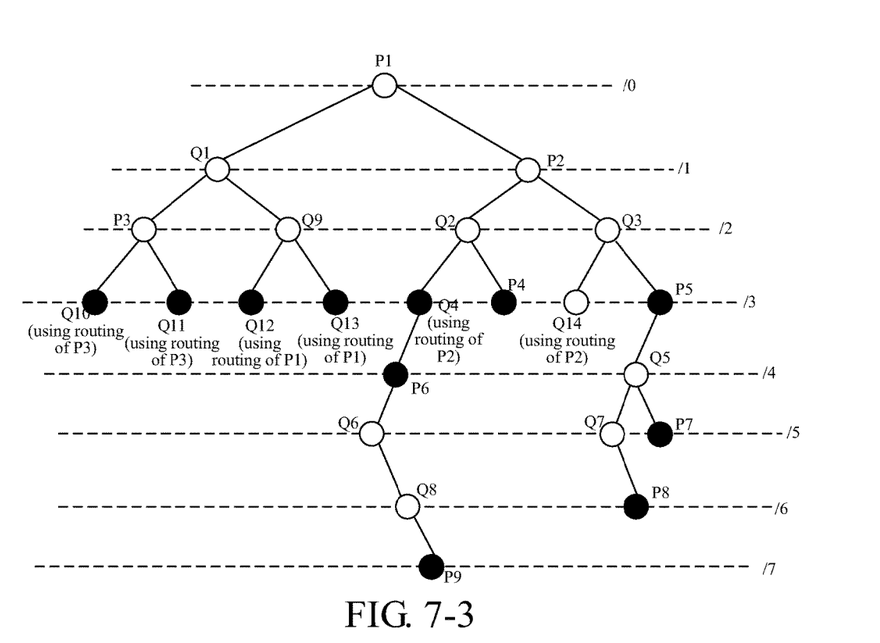

The routing of the prefix P3 may be expanded to the prefixes Q10 and Q11 in level /3, as shown in FIG. 7-3.

The routing of the prefix Q9 may be expanded to the prefixes Q12 and Q13 in level /3, as shown in FIG. 7-3.

The routing of the prefix Q2 may be expanded to the prefixes Q4 and P4 in level /3. Since the prefix P4 is valid and the priority of the routing of the prefix P4 is higher than the priority of the routing of the prefix Q2, the routing of the prefix Q2 (i.e., the routing of the prefix P2) may be expanded to the prefix Q4, as shown in FIG. 7-3.

The routing of the prefix Q3 may be expanded to the prefixes Q14 and P5 in level /3. Since the prefix P5 is valid and the priority of the routing of the prefix P5 is higher than the priority of the routing of the prefix Q3, the routing of the prefix Q3 may be expanded to the prefix Q14, as shown in FIG. 7-3.

At block 703, default routing of the prefix in level /0 is saved in a fixed location of a DRAM.

Each VPN usually has default routing 0.0.0.0/0. If the default routing is expanded to prefixes in level /9 of the Multibit Trie according to the prefix expansion method, each Multibit Trie has 512 valid Branch_Trees. In this case, a multi-VPN routing table may include a large number of redundant Branch_Trees.

At block 704, each of $2^9=512$ next-level branches of layer 0 is taken as a Branch_Tree.

Each Branch_Tree is composed of Sub_Tries of layer 1 with step size 8, layer 2 with step size 8 and layer 3 with step size 7.

At block 705, the data structure information of each Branch_Tree is saved in the DRAM, wherein the data structure information of the Branch_Tree includes data structure information of all Sub_Trie nodes of the Branch_Tree in layer 1, layer 2 and layer 3.

The data structure information of each Sub_Trie node in layer 1, layer 2 and layer 3 includes the Internal Tree Bitmap, the Extending Paths Bitmap, the Result Array Pointer and the Child Node Pointer. Since each Sub_Trie node in layer 3 has no a next-level branch, the data structure information of each Sub_Trie node in layer 3 includes the Internal Tree Bitmap and the Result Array Pointer.

According to the structure of the Multibit Trie, it can be learned that:

Layer 0 always includes one Sub_Trie node, represented as Sub_Trie node 1.

If p branches of the Sub_Trie node 1 have next-level Sub_Trie nodes, layer 1 includes p Sub_Trie nodes.

If q branches of p Sub_Trie nodes in layer 1 have next-level Sub_Trie nodes, layer 2 includes q Sub_Trie nodes.

If r branches of q Sub_Trie nodes in layer 2 have next-level Sub_Trie nodes, layer 3 includes r Sub_Trie nodes.

In a Branch_Tree, layer 1 includes $2^9=512$ Sub_Trie nodes at most, layer 2 includes $2^{17}=128K$ Sub_Trie nodes at most, and layer 3 includes $2^{24}=32M$ Sub_Trie nodes at most.

At block 706, a VRB Table is maintained for $2^9=512$ Branch_Trees, and the VRB Table includes a CEPB and a CNP.

The CEPB may indicate the routing distribution of 512 Branch_Trees and includes 64 bits. Every eight continuous Branch_Trees correspond to one bit of the CEPB. If one of the eight continuous Branch_Trees is valid, the bit corresponding to the eight continuous Branch_Trees is valid, and the bit is "1".

The CNP indicates a pointer of the first Branch_Tree in the eight continuous Branch_Trees corresponding to the first valid bit of the CEPB, i.e., a starting address of the data structure information of the first Branch_Tree in the memory.

A pointer of any valid Branch_Tree, i.e., a Branch_Tree is valid, may be calculated through the CEPB and the CNP.

At block 707, when LPM routing of an IPv4 address in a VPN is to be searched, a VRB Table of a Multibit-Trie corresponding to the VPN is searched.

At block 708, the highest 9 bits of the IPv4 address are obtained, a decimal system value corresponding to the highest 6 bits of the IPv4 address is calculated, represented as v, and the $v^{th}$ bit is found in the found VRB Table.

The range of the decimal system value v corresponding to the highest 6 bits of the IPv4 address is $0\sim(2^6-1)$, i.e., 0~63.

At block 709, it is determined whether the value of the $v^{th}$ bit is equal to 0 or 1; if the value of the $v^{th}$ bit is equal to 0, the default routing saved in the fixed location of the DRAM is taken as a LPM routing search result, and the flowchart terminates; if the value of the $v^{th}$ bit is equal to 1, block 710 is performed.

At block 710, a decimal system value corresponding to the lowest 3 bits in the highest 9 bits of the IPv4 address, represented as w, it is determined to search for the LPM routing in the $w^{th}$ bit in the eight Branch_Trees corresponding to the $v^{th}$ bit in the VRB Table of the VPN, the data structure information of the Branch_Tree is found according to the CNP, and the LPM routing of the IPv4 address is searched according to the data structure information of the Branch_Tree.

The range of the decimal system value w corresponding to the lowest 3 bits in the highest 9 bits of the IPv4 address is $0\sim(2^3-1)$, i.e., 0~7.

After block 710, if the LPM routing of the IPv4 address is not found in the determined Branch_Tree, the default routing of the prefix in level /0 is found from the fixed location of the DRAM, and taken as the LPM routing of the IPv4 address.

In some examples, for the Multibit Trie corresponding to each VPN, data structure information of Sub_Trie nodes in other layers except layer 0 is saved in an external DRAM. The size of the data structure information of Sub_Trie nodes affects the access performance of the DRAM. In some examples, the step size of a Sub_Trie node is 8 or 7, and the data structure information of the Sub_Trie node includes:

Internal Tree Bitmap, which includes 255 bits,
Extending Paths Bitmap, which includes 256 bits,
Result Array Pointer, which includes 24 bits, and
Child Node Pointer, which includes 24 bits.

Accordingly, the data structure information of one Sub_Trie node includes 559 bits.

In order to reduce a storage space occupied by the data structure information of Sub_Trie nodes, each Sub_Trie node in other layers except layer 0 is optimized as follows:

routing of prefixes in levels /0, /1 and /2 of each Sub_Trie is expanded to prefixes in level /3 according to a prefix expansion method.

Figure 8:
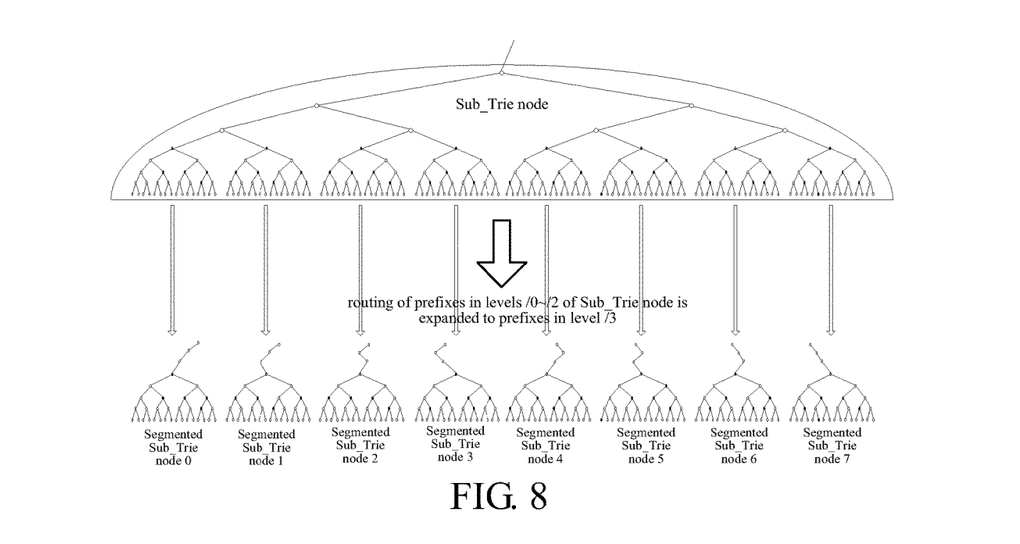
FIG. 8 is a diagram illustrating a process of dividing a Sub_Trie node into eight Segmented Sub_Tries according to some examples of the present disclosure.

FIG. 8 is a diagram illustrating a process of dividing a Sub_Trie node into eight Segmented Sub_Tries according to some examples of the present disclosure. In FIG. 8, the routing of prefixes in levels /0, /1 and /2 of a Sub_Trie node is expanded to prefixes in level /3.

Each Sub_Trie node is divided into 8 Segmented Sub_Trie nodes evenly, and data structure information of each Segmented Sub_Trie node is saved in the DRAM. The data structure information of each Segmented Sub_Trie node is indexed by the highest 3 bits of an IP address of the Segmented Sub_Trie node.

For example, in Segmented Sub_Trie nodes 0~7 shown in FIG. 8, an index of Segmented Sub_Trie 0 is 000, an index of Segmented Sub_Trie 1 is 001, an index of Segmented Sub_Trie 2 is 010, an index of Segmented Sub_Trie 3 is 011, an index of Segmented Sub_Trie 4 is 100, an index of Segmented Sub_Trie 5 is 101, an index of Segmented Sub_Trie 6 is 110, and an index of Segmented Sub_Trie 7 is 111.

According to FIG. 8, the size of data structure information of each Segmented Sub_Trie node is one eighth of the size of original data structure information of the Sub_Trie node.

At block 710, when searching for the LPM routing of the IPv4 address in the determined Branch_Tree and when searching in a layer, according to the highest 3 bits of 7 bits corresponding to the IPv4 address in the layer, a segmented Sub_Trie is indexed in the layer, and the LPM routing is searched according to the data structure information of the segmented Sub_Trie node. In this case, a search speed of the LPM routing can be improved greatly.

In a Branch_Tree, layer 1 has 512 Sub_Trie nodes at most, layer 2 has 64K Sub_Trie nodes at most, layer 3 has 16M Sub_Trie nodes at most, and so on. The number of Sub_Trie nodes in layers is increased orderly. Accordingly, the last layer has the largest number of Sub_Trie nodes. However, according to Internet routing and routing distribution of a data center, the number of routings in each Sub_Trie node in the last layer is usually smaller than 4. Accordingly, the data structure of the Sub_Trie node in the last layer is optimized as follows.

In order to distinguish the data structure of the Sub_Trie node in the last layer from the data structures of other Sub_Trie nodes, the data structure of the Sub_Trie node in the last layer is called a data structure of a Compressed Sub_Trie node, which includes 4 Prefix Keys and a Result Array ptr (24 bits).

Each Prefix key indicates the last 7 bits of an IP address of a valid IP prefix in the Sub_Trie node in the last layer.

The length of a Prefix Key is 7 bits, and the length of 4 Prefix Keys is 28 bits.

Accordingly, the Prefix Key may replace an Internal Tree Bitmap.

The length of 4 Prefix Keys is 28 bits, the length of the Result Array ptr is 24 bits, and thus the length of the data structure of a Compressed Sub_Trie node is 52 bits.

At block 710, when searching for the LPM routing of the IPv4 address in the determined Branch_Tree and when searching in the last layer (i.e., layer 3), 7 bits (i.e., the lowest 7 bits) of the IPv4 address in the layer is matched with a Prefix Key in the data structure of each Compressed Sub_Trie node in layer 3, and if the matching is successful, the LPM routing is determined according to the Result Array ptr. In this case, the search speed of the LPM routing can be improved greatly.

In some examples, IPv4 routing and IPv6 routing of a multi-VPN instance is supported. Through dividing the Multibit-Trie into 512 Branch_Trees, the routing search speed may be improved. Since default routing is saved separately rather than expanded to layer 1, the number of redundant nodes in the Multibit-Trie is reduced, and thus the routing search speed may be further improved. After prefix expansion, the Sub_Trie node is divided into 8 Segmented Sub_Trie nodes, thereby further improving routing search speed. Through simplifying the data structure of the Sub_Trie node in the last layer, the routing search speed may be further improved.

Figure 9:
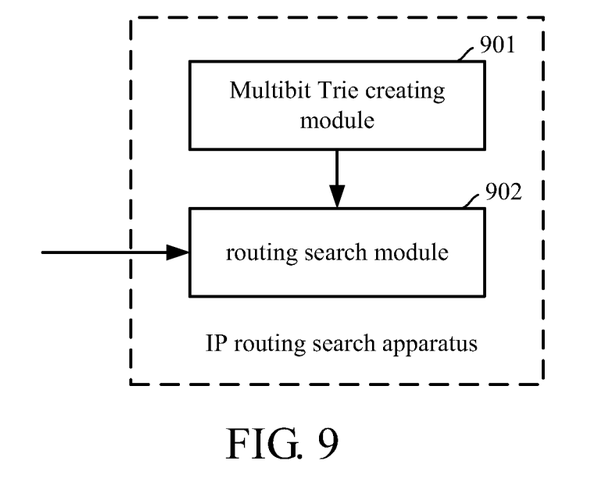
FIG. 9 is a diagram illustrating the structure of an IP routing search apparatus based on a Multibit Trie according to some examples of the present disclosure.

FIG. 9 is a diagram illustrating the structure of an IP routing search apparatus based on a Multibit Trie according to some examples of the present disclosure. As shown in FIG. 9, the apparatus includes a Multibit Trie creating module 901 and a routing search module 902.

The Multibit Trie creating module 901 may create a Multibit Trie for routing distribution of IP prefixes in each VPN, expand routing of IP prefixes in the highest level 1~m of the Multibit Trie to IP prefixes in level m+1 according to a prefix expansion method, wherein m is an integer larger than 1, take each branch of the IP prefixes in the level m+1 of the Multibit Trie as a Branch_Tree, and save data structure information of each Branch_Tree.

When routing of an IP address in a VPN is to be searched, the routing search module 902 may search for a Branch_Tree in a Multibit Trie corresponding to the VPN according to the highest m+1 bits of the IP address, and search for the routing of the IP address in the Branch_Tree.

In some examples, the Multibit Trie creating module 901 may save default routing of prefixes in level 0 in a pre-defined area of an off-chip storage.

In some examples, when saving the data structure information of each Branch_Tree, the Multibit Trie creating module 901 may save the data structure information of each Branch_Tree in an idle area of the off-chip storage.

In some examples, when saving the data structure information of each Branch_Tree, the Multibit Trie creating module 901 may further perform a following process of:

maintaining a VRB table for the Branch_Tree. The VRB Table contains a CEPB and a CNP. The CEPB includes $2^{m-1}/2^d$ bits, and every $2^d$ continuous Branch_Trees correspond to one bit of the CEPB. When the $2^d$ continuous Branch_Trees include a valid Branch_Tree, the bit of the CEPB corresponding to the $2^d$ continuous Branch_Trees is valid; and when the $2^d$ continuous Branch_Trees do not include a valid Branch_Tree, the bit of the CEPB corresponding to the $2^d$ continuous Branch_Trees is invalid, wherein d is a positive integer. The CNP indicates a pointer of the first Branch_Tree in the $2^d$ continuous Branch_Trees corresponding to the first valid bit of the CEPB.

In some examples, when searching for the Branch_Tree in the Multibit Trie corresponding to the VPN according to the highest m+1 bits of the IP address, and searching for the routing of the IP address in the Branch_Tree, the routing search module 902 may perform a following process of:

obtaining the highest m+1 bits of the IP address, and finding a bit in the CEPB of the VRB Table of the Multibit-Trie according to the highest m+1−d bits of the IP address; if the found bit is valid, determining a CNP corresponding to the lowest d bits of the highest m+1 bits of the IP address, and finding data structure information of the Branch_Tree according to the CNP; and searching for the routing of the IP address according to the data structure information of the Branch_Tree.

In some examples, before expanding the routing of the IP prefixes in the highest level 1~m of the Multibit Trie to the IP prefixes in the level m+1 according to the prefix expansion method, the Multibit Trie creating module 901 may perform a following process of:

according to a rule of making a segment including more valid IP prefixes be located in the bottom of a layer, classifying IP prefixes in levels 0~8 of the Multibit Trie into layer 0, classifying IP prefixes in the lowest 7 levels into the last layer, and dividing other IP prefixes into multiple layers according to step size 8.

In some examples, when expanding the routing of the IP prefixes in the highest level 1~m of the Multibit Trie to the IP prefixes in the level m+1 according to the prefix expansion method, the Multibit Trie creating module 901 may perform a following process of:

expanding routing of IP prefixes in levels 1~8 of the Multibit Trie to IP prefixes in level 9 according to the prefix expansion method.

In some examples, when saving the data structure information of each Branch_Tree, the Multibit Trie creating module 901 may perform a following process of:

for each Sub_Trie in each layer in each Branch_Tree except layer 0, expanding routing of IP prefixes in levels 0, 1 and 2 in the Sub_Trie to IP prefixes in level 3; dividing each Sub_Trie into eight segmented Sub_Tries evenly, and saving data structure information of each segmented Sub_Trie, wherein each segmented Sub_Trie is indexed by IP prefixes of the highest 3 levels of the Sub_Trie.

In some examples, when searching for the routing in the Branch_Tree, the routing search module 902 may perform a following process of:

when searching for the routing in a layer, indexing a segmented Sub_Trie in the Sub_Trie in the layer according to the highest 3 bits of 7 bits corresponding to the IP address in the layer, and searching for the routing according to the data structure information of the segmented Sub_Trie.

In some examples, the data structure information of each Sub_Trie in the last layer includes:

q Prefix Keys, wherein each Prefix key indicates the lowest 7 bits of an IP addresses of a valid IP prefix in the Sub_Trie, q is the predefined maximum number of valid IP prefixes in the Sub_Trie; and a Result Array ptr.

In some examples, when searching for the routing in the Branch_Tree and searching in the last layer, the routing search module 902 matches the lowest 7 bits of the IP address with Prefix Keys in the data structure information of each Sub_Trie in the last layer; if the lowest 7 bits of the IP address matches with the Prefix Keys in the data structure information of each Sub_Trie in the last layer, the routing search module 902 determines the routing according to the Result Array ptr.

In some examples, when searching for the routing in the Branch_Tree, the routing search module 902 may further perform following processes of:

if the routing is not found, obtaining the default routing from the predefined area of the off-chip storage, and taking the default routing as the final routing.

Figure 10:
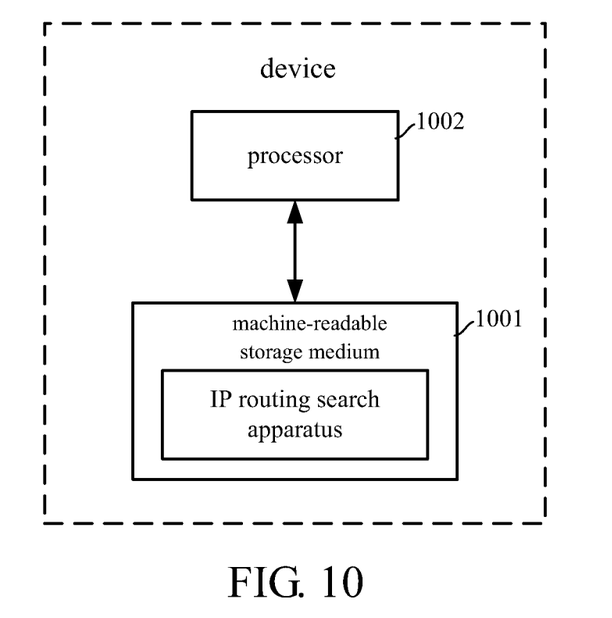
FIG. 10 is a diagram illustrating a hardware structure of a device including the IP routing search apparatus according to some examples of the present disclosure.

Some examples of the present disclosure also provide a device including the IP routing search apparatus. The device may be a programmable device combining software with hardware. A hardware structure of the device is shown in FIG. 10. The device includes a machine-readable storage medium 1001, a processor 1002, for example, a CPU, and other hardware (not shown in FIG. 10).

The machine-readable storage medium 1001 may store instruction codes. The instruction codes may be executed by the processor 1002, for example, the CPU, to implement the functions of the IP routing search apparatus.

The processor 1002, for example, the CPU, may communicate with the machine-readable storage medium 1001, read and execute the instruction codes stored in the machine-readable storage medium 1001 to implement the functions of the IP routing search apparatus.

When the IP routing search apparatus is a logic apparatus, the IP routing search apparatus is formed through executing the computer program instructions stored in the machine-readable storage medium by the CPU. When the computer program instructions are executed, the IP routing search apparatus is operated according to the above IP routing search method.

The machine-readable storage medium may be an electronic, magnetic or optical storage device or any physical storage device, and may include or store information such as executable instructions and data. For example, the machine-readable storage medium may be a Radom Access Memory (RAM), a transitory storage, a non-transitory storage, a flash memory, a storage driver such as a hard disk driver, a solid-state hard disk, any type of storage disk such as an optical disc and DVD, or a similar storage medium, or any combination thereof.

The foregoing are some examples of the present disclosure and are not used to limit the protection scope of the present disclosure. Any modification, equivalent substitution and improvement without departing from the spirit and principle of the present disclosure are within the protection scope of the present disclosure.

What is claimed is:

1. An Internet Protocol (IP) routing search method, comprising:

creating a Multibit Trie for routing distribution of IP prefixes in each Virtual Private Network (VPN);

expanding routing of IP prefixes in the highest level 1 to m of the Multibit Trie to IP prefixes in level m+1 according to a prefix expansion method, wherein m is an integer larger than 1;

taking each branch of the IP prefixes in the level m+1 of the Multibit Trie as a BranchTree, and saving data structure information of each Branch_Tree; and in process of routing of an IP address in a VPN to be searched, searching for a BranchTree in a Multibit Trie corresponding to the VPN according to the highest m+1 bits of the IP address, and searching for the routing of the IP address in the BranchTree.

2. The method of claim 1, wherein default routing of a prefix in level 0 is saved in a predefined area of an off-chip storage;

the saving the data structure information of each Branch_Tree comprises: saving the data structure information of each Branch_Tree in an idle area of the off-chip storage.

3. The method of claim 1, wherein the saving the data structure information of each Branch_Tree further comprises:

maintaining a VPN Root Bitmap (VRB) table for the Branch_Tree, wherein the VRB Table contains a Compressed Extending Path Bitmap (CEPB) and a Child Node Pointer (CNP);

the CEPB includes $2^{m+1}/2^d$ bits, and every $2^d$ continuous Branch_Trees correspond to one bit of the CEPB; when the $2^d$ continuous Branch_Trees include a valid Branch_Tree, the bit of the CEPB corresponding to the $2^d$ continuous Branch_Trees is valid, wherein d is a positive integer;

the CNP indicates a pointer of the first Branch_Tree in the $2^d$ continuous Branch_Trees corresponding to the first valid bit of the CEPB;

the searching for the Branch_Tree in the Multibit Trie corresponding to the VPN according to the highest m+1 bits of the IP address, and searching for the routing of the IP address in the Branch_Tree comprises:

obtaining the highest m+1 bits of the IP address, and finding a bit in the CEPB of the VRB Table of the Multibit-Trie according to the highest m+1-d bits of the IP address;

when the found bit is valid, determining a CNP corresponding to the lowest d bits of the highest m+1 bits of the IP address, and finding data structure information of the Branch_Tree according to the CNP; and searching for the routing of the IP address according to the data structure information of the Branch_Tree.

4. The method of claim 1, before expanding the routing of the IP prefixes in the highest level 1 to m of the Multibit Trie to the IP prefixes in the level m+1 according to the prefix expansion method, further comprising:

according to a rule of making a segment including more valid IP prefixes be located in the bottom of a layer, classifying IP prefixes in levels 0 to 8 of the Multibit Trie into layer 0, classifying IP prefixes in the lowest 7 levels into the last layer, and dividing other IP prefixes into multiple layers according to step size 8;

the expanding the routing of the IP prefixes in the highest level 1 to m of the Multibit Trie to the IP prefixes in the level m+1 according to the prefix expansion method comprises:

expanding routing of IP prefixes in levels 1 to 8 of the Multibit Trie to IP prefixes in level 9 according to the prefix expansion method.

5. The method of claim 4, wherein the saving the data structure information of each Branch_Tree further comprises:
for each Sub_Trie in each layer in each Branch_Tree except layer 0, expanding routing of IP prefixes in levels 0, 1 and 2 in the Sub_Trie to IP prefixes in level 3;
dividing each Sub_Trie into eight segmented Sub_Tries evenly, and saving data structure information of each segmented Sub_Trie, wherein each segmented Sub_Trie is indexed by IP prefixes of the highest 3 levels of the Sub_Trie;
the searching for the routing in the Branch_Tree comprises:
when searching for the routing in a layer, indexing a segmented Sub_Trie in a Sub_Trie in the layer according to the highest 3 bits of 7 bits corresponding to the IP address in the layer, and searching for the routing according to data structure information of the segmented Sub_Trie.

6. The method of claim 4, wherein data structure information of each Sub_Trie in the last layer comprises:
q Prefix Keys, wherein each Prefix key indicates the lowest 7 bits of an IP addresses of a valid IP prefix in the Sub_Trie, q is the predefined maximum number of valid IP prefixes in the Sub_Trie; and
a Result Array pointer;
when searching for the routing in the Branch_Tree and searching in the last layer, the lowest 7 bits of the IP address are matched with Prefix Keys in the data structure information of each Sub_Trie in the last layer; when the lowest 7 bits of the IP address matches with the Prefix Keys in the data structure information of each Sub_Trie in the last layer, the routing is determined according to the Result Array pointer.

7. The method of claim 2, wherein the searching for the routing in the Branch_Tree further comprises:
when the routing is not found, obtaining the default routing from the predefined area of the off-chip storage, and taking the default routing as the final routing.

8. An Internet Protocol (IP) routing search apparatus, comprising:
a Multibit Trie creating module, to create a Multibit Trie for routing distribution of IP prefixes in each VPN, expand routing of IP prefixes in the highest level 1 to m of the Multibit Trie to IP prefixes in level m+1 according to a prefix expansion method, wherein m is an integer larger than 1, take each branch of the IP prefixes in the level m+1 of the Multibit Trie as a Branch_Tree, and save data structure information of each Branch_Tree; and
a routing search module, when routing of an IP address in a VPN is to be searched, to search for a Branch_Tree in a Multibit Trie corresponding to the VPN according to the highest m+1 bits of the IP address, and search for the routing of the IP address in the Branch_Tree.

9. The apparatus of claim 8, wherein the Multibit Trie creating module is to save default routing of prefixes in level 0 in a predefined area of an off-chip storage;
when saving the data structure information of each Branch_Tree, the Multibit Trie creating module is to save the data structure information of each Branch_Tree in an idle area of the off-chip storage.

10. The apparatus of claim 8, wherein, when saving the data structure information of each Branch_Tree, the Multibit Trie creating module is further to perform a process of:
maintaining a VPN Root Bitmap (VRB) table for the Branch_Tree, wherein the VRB Table contains a Compressed Extending Path Bitmap (CEPB) and a a Child Node Pointer (CNP), the CEPB includes $2^{m-1}/2^d$ bits, and every $2^d$ continuous Branch_Trees correspond to one bit of the CEPB; when the $2^d$ continuous Branch_Trees include a valid Branch_Tree, the bit of the CEPB corresponding to the $2^d$ continuous Branch_Trees is valid, wherein d is a positive integer; the CNP indicates a pointer of the first Branch_Tree in the $2^d$ continuous Branch_Trees corresponding to the first valid bit of the CEPB;
when searching for the Branch_Tree in the Multibit Trie corresponding to the VPN according to the highest m+1 bits of the IP address, and searching for the routing of the IP address in the Branch_Tree, the routing search module is to perform a process of:
obtaining the highest m+1 bits of the IP address, and finding a bit in the CEPB of the VRB Table of the Multibit-Trie according to the highest m+1-d bits of the IP address; when the found bit is valid, determining a CNP corresponding to the lowest d bits of the highest m+1 bits of the IP address, and finding data structure information of the Branch_Tree according to the CNP; and
searching for the routing of the IP address according to the data structure information of the Branch_Tree.

11. The apparatus of claim 8, wherein, before expanding the routing of the IP prefixes in the highest level 1 to m of the Multibit Trie to the IP prefixes in the level m+1 according to the prefix expansion method, the Multibit Trie creating module is further to perform a process of:
according to a rule of making a segment including more valid IP prefixes be located in the bottom of a layer, classifying IP prefixes in levels 0 to 8 of the Multibit Trie into layer 0, classifying IP prefixes in the lowest 7 levels into the last layer, and dividing other IP prefixes into multiple layers according to step size 8;
when expanding the routing of the IP prefixes in the highest level 1 to m of the Multibit Trie to the IP prefixes in the level m+1 according to the prefix expansion method, the Multibit Trie creating module is to perform a process of:
expanding routing of IP prefixes in levels 1 to 8 of the Multibit Trie to IP prefixes in level 9 according to the prefix expansion method.

12. The apparatus of claim 11, wherein, when saving the data structure information of each Branch_Tree, the Multibit Trie creating module is to perform a process of:
for each Sub_Trie in each layer in each Branch_Tree except layer 0, expanding routing of IP prefixes in levels 0, 1 and 2 in the Sub_Trie to IP prefixes in level 3; dividing each Sub_Trie into eight segmented Sub_Tries evenly, and saving data structure information of each segmented Sub_Trie, wherein each segmented Sub_Trie is indexed by IP prefixes of the highest 3 levels of the Sub_Trie;
when searching for the routing in the Branch_Tree, the routing search module is to perform a process of:
when searching for the routing in a layer, indexing a segmented Sub_Trie in the Sub_Trie in the layer according to the highest 3 bits of 7 bits corresponding to the IP address in the layer, and searching for the routing according to the data structure information of the segmented Sub_Trie.

13. The apparatus of claim 11, wherein the data structure information of each Sub_Trie in the last level comprises:

q Prefix Keys, wherein each Prefix key indicates the lowest 7 bits of an IP addresses of a valid IP prefix in the Sub_Trie, q is the predefined maximum number of valid IP prefixes in the Sub_Trie; and a Result Array pointer;

when searching for the routing in the Branch_Tree and searching in the last layer, the routing search module is to match the lowest 7 bits of the IP address with Prefix Keys in the data structure information of each Sub_Trie in the last layer; and when the lowest 7 bits of the IP address matches with the Prefix Keys in the data structure information of each Sub_Trie in the last layer, determine the routing according to the Result Array pointer.

14. The apparatus of claim 9, wherein when searching for the routing in the Branch_Tree, the routing search module is to further perform a process of:

when the routing is not found, obtaining the default routing from the predefined area of the off-chip storage, and taking the default routing as the final routing.

15. An Internet Protocol (IP) routing search apparatus, comprising a non-transitory machine-readable storage medium which stores instruction codes and a processor, the instruction codes being configured to cause the processor to execute the method according to claim 1.

16. A non-transitory machine-readable storage medium storing computer program instructions for executing the method accordingly to claim 1 when the computer program instructions are executed.

* * * * *